United States Patent
Choi et al.

(10) Patent No.: US 7,450,608 B2
(45) Date of Patent: Nov. 11, 2008

(54) SUBSCRIBER DISTRIBUTION NETWORK APPARATUS AND SUBSCRIBER LINE UNIT THAT FACILITATES CONNECTION TO NETWORK SWITCH

(75) Inventors: Jeong-Seok Choi, Seoul (KR); Do-Hun Cha, Suwon-si (KR); Yun-Je Oh, Yongin-si (KR); Jun-Ho Koh, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 839 days.

(21) Appl. No.: 10/794,308

(22) Filed: Mar. 5, 2004

(65) Prior Publication Data

US 2005/0078960 A1   Apr. 14, 2005

(30) Foreign Application Priority Data

Sep. 16, 2003   (KR)   .................... 10-2003-0064071

(51) Int. Cl.
*H04L 12/66*   (2006.01)

(52) U.S. Cl. .................................................. 370/463

(58) Field of Classification Search ................ 370/487, 370/485, 467, 463, 489–490, 498, 534–538, 370/465–466; 398/47, 72, 90
See application file for complete search history.

(56) References Cited

U.S. PATENT DOCUMENTS

| | | | | |
|---|---|---|---|---|
| 5,339,315 A | * | 8/1994 | Maeda et al. | 725/103 |
| 5,576,874 A | * | 11/1996 | Czerwiec et al. | 398/75 |
| 6,751,417 B1 | * | 6/2004 | Combs et al. | 398/71 |
| 6,763,025 B2 | * | 7/2004 | Leatherbury et al. | 370/395.64 |
| 7,076,563 B1 | * | 7/2006 | Yamanaka et al. | 709/233 |
| 7,151,529 B2 | * | 12/2006 | Hung et al. | 345/168 |
| 7,170,859 B2 | * | 1/2007 | Yamada et al. | 370/245 |
| 7,289,732 B2 | * | 10/2007 | Koh et al. | 398/75 |
| 2002/0063924 A1 | * | 5/2002 | Kimbrough et al. | 359/125 |
| 2003/0061341 A1 | * | 3/2003 | Loh et al. | 709/224 |
| 2004/0022536 A1 | * | 2/2004 | Koh et al. | 398/41 |
| 2004/0161236 A1 | * | 8/2004 | Koh et al. | 398/75 |

* cited by examiner

*Primary Examiner*—Kwang B. Yao
*Assistant Examiner*—Candal Elpenord
(74) *Attorney, Agent, or Firm*—Cha & Reiter, LLC

(57) ABSTRACT

A subscriber distribution network includes a backplane board that has a network switch and a plurality of subscriber line units, the network data, the plurality of subscriber line units being provided between the network switch and subscriber set-tops, providing data from the network switch to a corresponding subscriber set-top, and providing data transmitted from the subscriber set-tops to the network switch. In the subscriber distribution network apparatus, the network switch can be connected in simple fashion to the subscriber line units by connectors.

15 Claims, 5 Drawing Sheets

SUBSCRIBER DISTRIBUTION NETWORK APPARATUS AND SUBSCRIBER LINE UNIT THAT FACILITATES CONNECTION TO NETWORK SWITCH

CLAIM OF PRIORITY

This application claims priority to an application entitled "Subscriber distribution network apparatus and subscriber line unit which can in simple fashion connect with network switch," filed in the Korean Intellectual Property Office on Sep. 16, 2003 and assigned Ser. No. 2003-64071, the contents of which are hereby incorporated by reference.

BACKGROUND OF THE INVENTION

1. Field of the Invention

The present invention relates to a convergence system of broadcasting and communication that provides subscribers by converging broadcasting and communication services through optical fiber transmission lines. More particularly, the present invention relates to a connection structure between a network switch (L2 switch), such as a layer 2 for processing an IP over Ethernet that is a communication service, and a subscriber line unit (SLU) in a subscriber distribution network apparatus of a convergence system of broadcasting and communication.

2. Description of the Related Art

In general, a communication network using the Ethernet protocol comprises a packet communication network that provides the foundation for most local area networks and Internet communication networks.

A 10 Base-T is commonly employed in most of the Ethernet communication networks utilized by subscribers, which is mainly used in local area networks, companies, and schools. Recent improvements in Ethernet technology has led to a metro Ethernet communication network providing subscriber homes with 100 Mbps Internet communication services of 100 Base-T by means of an unshielded twisted pair (hereinafter, referred to as an UTP) cable.

A convergence system of broadcasting and communication that utilizes Ethernet communication networks, Ethernet equipment that multiplexes digital broadcasting streams and Ethernet data by a time division multiplexing (TDM), generates new types of digital streams, and distributes the generated digital streams to subscribers.

FIG. 1 is a block diagram of a conventional convergence system of broadcasting and communication. As shown in FIG. 1, the conventional convergence system that provides broadcasting and communication services includes an optical line terminal (hereinafter, referred to as an OLT) 100, an optical network unit (hereinafter, referred to as an ONU) 102 comprising a plurality of ONUs numbered from 1 to N, and optical cables that connect plurality of ONUs to the OLT 100. The OLT 100 receives broadcasting data from broadcasters to provide subscribers with broadcasting services by converting the data into an optical signal containing bundled components that correspond to the data, and then transmitting one tied optical signal. The ONU 102 is a user-side apparatus that send information transmitted from the OLT 100 to subscribers. When broadcasting/communication data sent from broadcasters are subsequently transmitted to the ONU 102 via the OLT 100, the ONU 102 receives the service requirements of subscribers from a set-top box 104 and then provides corresponding services.

In designing the ONU 102 functioning as an optical subscriber distribution network for the users via set-top boxes, which simultaneously provides broadcasting and communication in a convergence system of broadcasting and communication as described above, a commercial L2 switch must be used as part of the network apparatus in order to process Ethernet-based packet data for communication services.

FIG. 2 shows a structure for connecting the commercial L2 switch. The switch outputs 100 Base-T signals in the ONU providing the convergence system of broadcasting and communication, to a plurality of subscriber line units (hereinafter, referred to as a SLU) for adding broadcasting signals, which are output from broadcasting signal receivers, to Ethernet signals outputted from the L2 switch 110 (shown in FIG. 2).

FIG. 2 shows outside media attachment units (hereinafter, referred to as a MAU) 114 have UTP cable interfaces, as well as media converters (hereinafter, referred to as a MIC) 120 that are additionally provided in the ONU 102. Further, the L2 switch 110 is connected to SLUs 130 through the outside MAUs 114 having UTP cable interfaces and the M/Cs 120. Herein, the M/Cs 120 convert 100 Base-T signals into 100 Base-F signals in order to input the 100 Base-T signals outputted from the L2 switch 110 to the SLUs 130.

The L2 switch 110 classifies the packets and controls paths of a commercial network switch outputting the 100 Base-T signals. In general, the L2 switch 110 includes a PHY 112 (PHY is an abbreviation for physical chip), which is connected to a switch chipset 111, and MAUs 113. Each of the MAUs 113 has a connector connection portion that connects each of the MAUs 113 to the PHY 112 through a connector. In addition, each of the MAUs has a UTP cable connection portion to which a UTP cable is connected. Further, each of the MAUs 113 generates power for transmitting signals through the UTP cable.

FIG. 3 shows that each of the SLUs 130 includes a first PHY 131, a time division multiplexing (hereinafter, referred to as a TDM) 132, a plurality of transceiving modules 133, a second PHY 134 provided between each of the transceiving modules 133 and the first PHY 131, and a voltage signal conversion unit 135. The first PHY 131 converts parallel signals having a type of a media independent interface (hereinafter, referred to as a MII) into 100 Base-F signals, or which converts 100 Base-F signals into MII signals. The TDM 132 multiplexes Ethernet signals having a MII type and broadcasting signals. The voltage signal conversion unit 135 converts the multiplexed signal outputted from the TDM 132 into a differential positive emitter coupled logic (PECL) signal, which is a voltage signal having a predetermined level, and then the voltage signal conversion unit provides the PECL signal to the transceiving modules 133. The second PHY 134 converts the PECL signals provided from the transceiving modules 133 into MII signals and then provides the MII signals to the first PHY 131.

In designing the ONU 102 by means of the L2 switch to process Ethernet-based packet data for communication services, the ONU 102, which is an optical subscriber distribution network apparatus for simultaneously providing broadcasting and communication, must include a MAU 114 and a M/C 120 in order to connect the L2 switch with the SLUs 130. The MAU 114 has an UTP cable connection portion and an RJ-45 connector connection portion, and the M/C 120 is used for converting 100 Base-T signals into 100 Base-F signals.

As described above, the commercial L2 switch has an UTP cable interface. Therefore, when the commercial L2 switch is used, it is necessary to provide separate apparatuses for the UTP cable interface between the commercial L2 switch and the SLUs. Further, when one subscriber distribution network comprises a system for providing services to several hundred subscriber (400~500 subscribers), a plurality of UTP cables are used for connecting the L2 switch to the plurality of SLUs. Therefore, the structure of the system becomes more complicated and the volume of the system increases, thereby having difficulties in providing an efficient subscriber distribution network.

SUMMARY OF THE INVENTION

Accordingly, the present invention has been made to solve the above-mentioned problems. The present invention provides a subscriber distribution network apparatus that can in simple fashion connect subscriber line units (SLUs) to a network switch.

In order to accomplish the aforementioned objects, according to an aspect of the present invention, there is provided a subscriber distribution network apparatus having a backplane board, which includes a network switch and a plurality of subscriber line units, the network switch switching Ethernet data and broadcasting data, the plurality of subscriber line units being provided between the network switch and subscriber set-tops, providing data from the network switch to a corresponding subscriber set-top box, and providing data transmitted from the subscriber set-tops to the network switch, wherein, the network switch includes a switch chipset and a first differential driver that converts serial signals of Ethernet data and broadcasting data outputted from the switch chipset into differential signals. According to the present invention, each of the subscriber line units includes a second differential driver, a signal converter, a time division multiplexing processing unit, and an optical transceiving module. The second differential driver is connected to the first differential driver through a connector and restores the differential signals into serial signals. The signal converter converts the serial signals output from the second differential driver into parallel signals. The time division multiplexing processing unit multiplexes the Ethernet signal and broadcast signal output in parallel to each other from the signal converter, and converts the multiplexed signal into a voltage signal having a predetermined level. Finally, the optical transceiving module converts the voltage signal into an optical signal, outputs the optical signal to the subscriber set-tops, and provides the second differential driver with signals transmitted from the subscriber set-tops.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
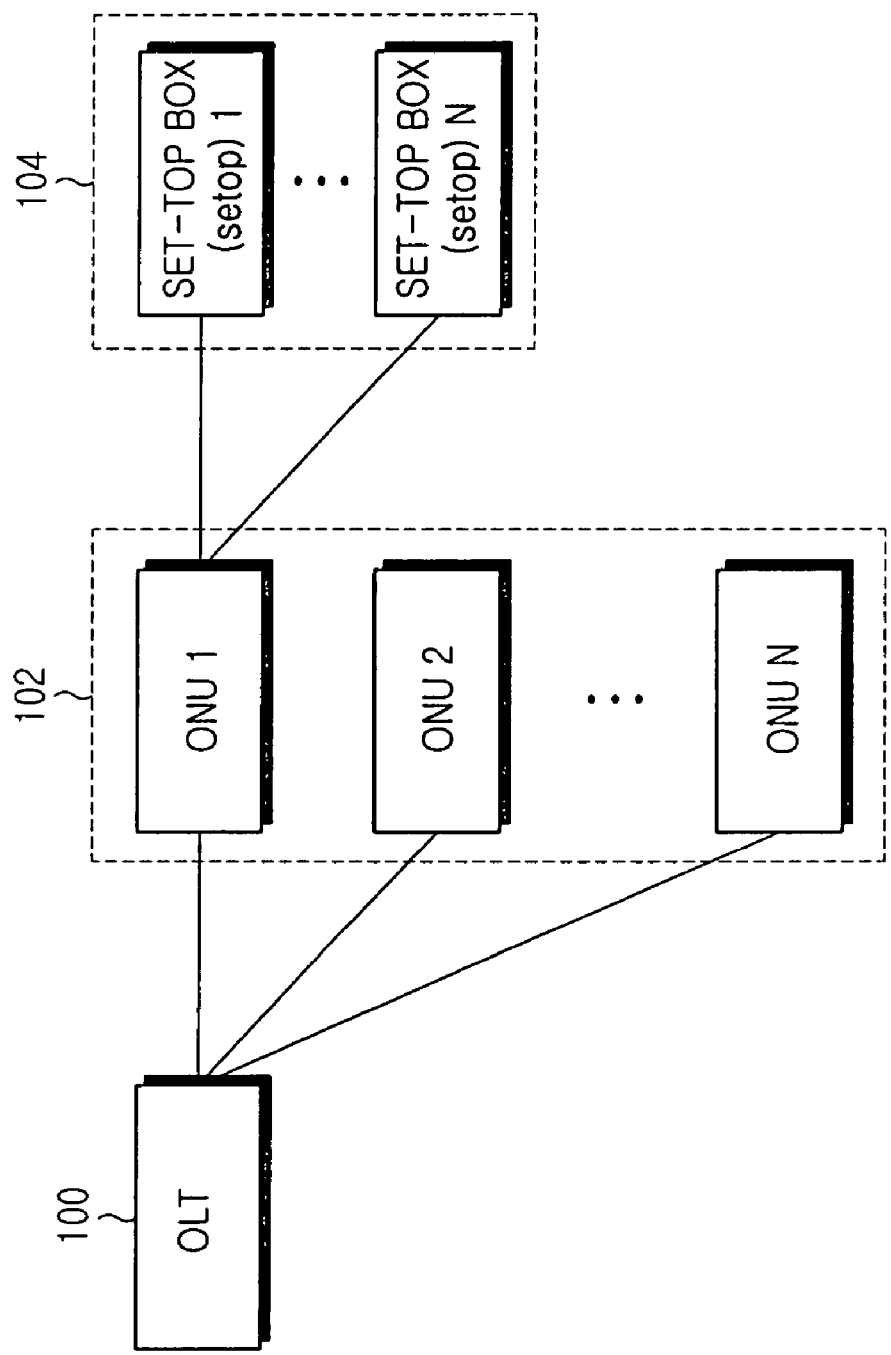
FIG. 1 is a block diagram of a conventional convergence system of broadcasting and communication.
Figure 2:
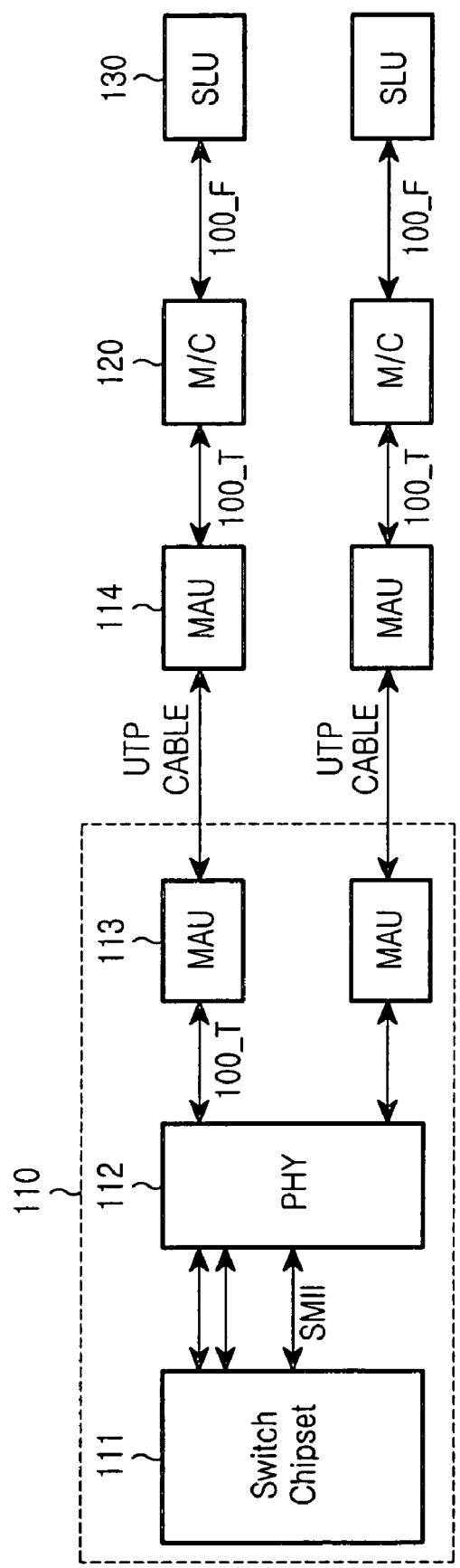
FIG. 2 is a block diagram showing a structure for connecting a L2 switch to subscriber line units (SLUs) in a subscriber distribution network apparatus of a conventional convergence system of broadcasting and communication.
Figure 3:
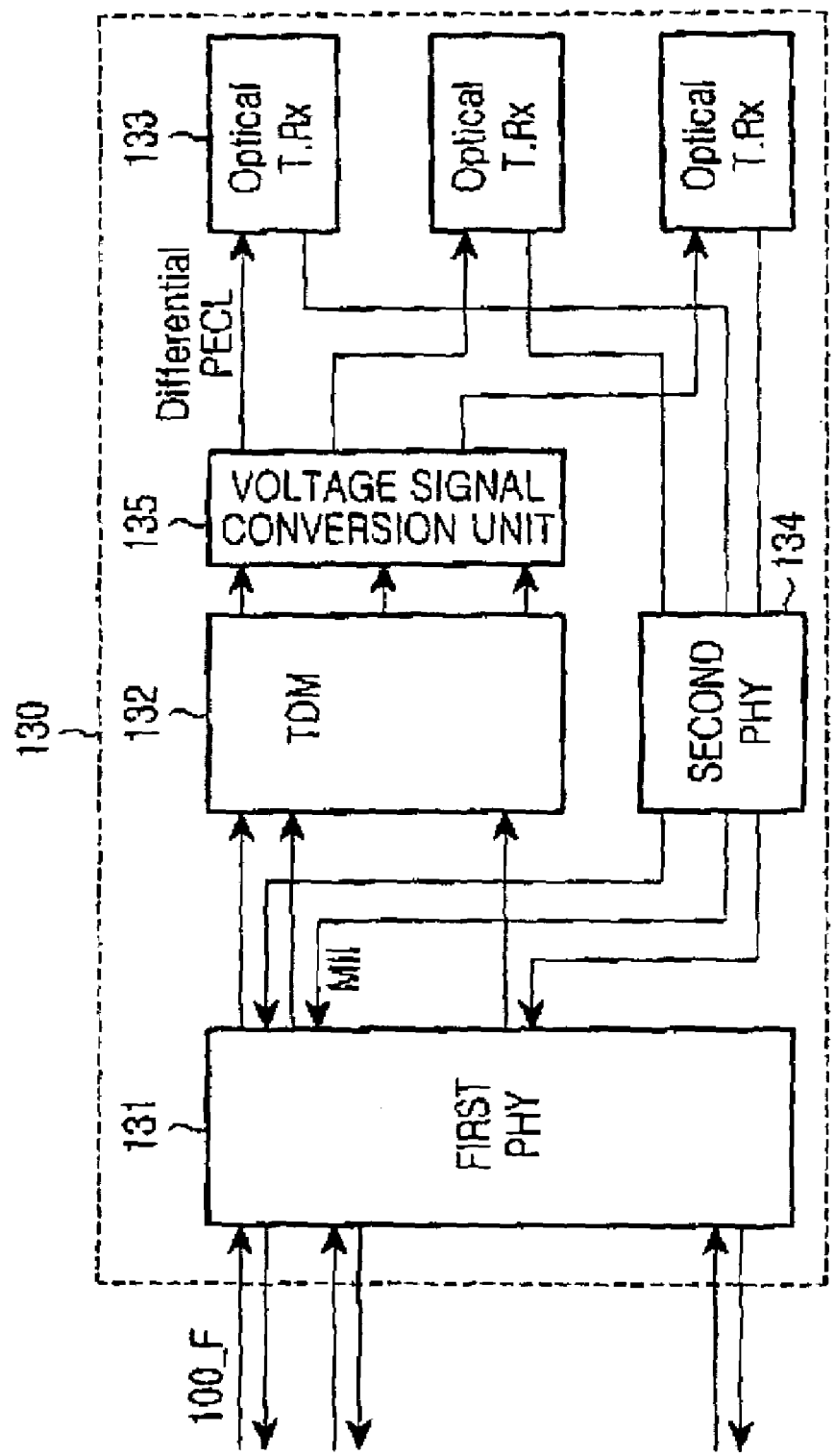
FIG. 3 is a block diagram of each of the SLUs in FIG. 2.
Figure 4:
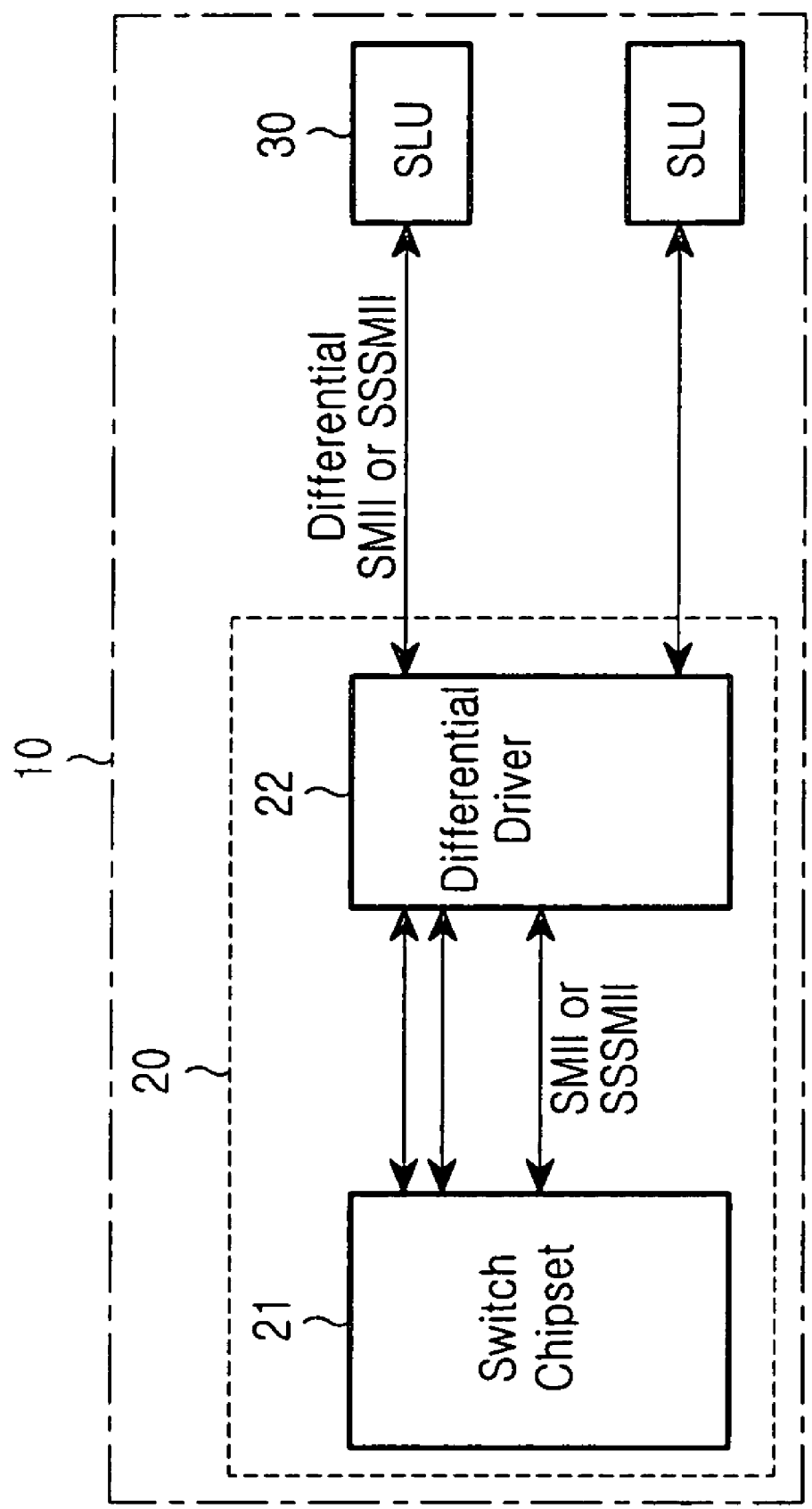
FIG. 4 is a block diagram showing a structure for connecting a L2 switch to subscriber line units (SLUs) in a subscriber distribution network apparatus according to the present invention.

Hereinafter, one or more preferred aspects of the present invention will be described with reference to the accompanying drawings. The same reference numerals are used to designate the same elements as those shown in other drawings. In the description below, there are many particular items, such as detailed elements of circuit, are shown, but these are provided for helping the general understanding of the present invention. It is to be understood by those skilled in the art that the present invention can be embodied without such particular items. In the following description of the present invention, there are instances when a detailed description of known functions and configuration incorporated herein will be omitted when it may possible obscure the subject matter of the present invention FIG. 4 is a block diagram of a subscriber distribution network apparatus according to the present invention. As shown in FIG. 4, a network switch 20 is connected to SLUs 30 through connectors and provided in the same backplane board 10.

According to the present invention, the network switch 20, is newly constituted, and includes a switch chipset 21 and a differential driver 22. The differential driver 22 is connected to the SLUs 30 through connectors. The switch chipset 21 in the network switch 20 switches Ethernet signals transmitted from an OLT and provides the switched signals to corresponding SLUs.

Further, the switch chipset 21 outputs signals that have a type of a serial media independent interface (hereinafter, referred to as a SMII) or a source synchronous SMII (hereinafter, referred to as a SSSMII), to the differential driver 22. Further, the differential driver 22 converts the SMII signals or SSSMII signals into differential SMII signals or differential SSSMII signals and then outputs the converted signals to the SLUs 30.

Figure 5:
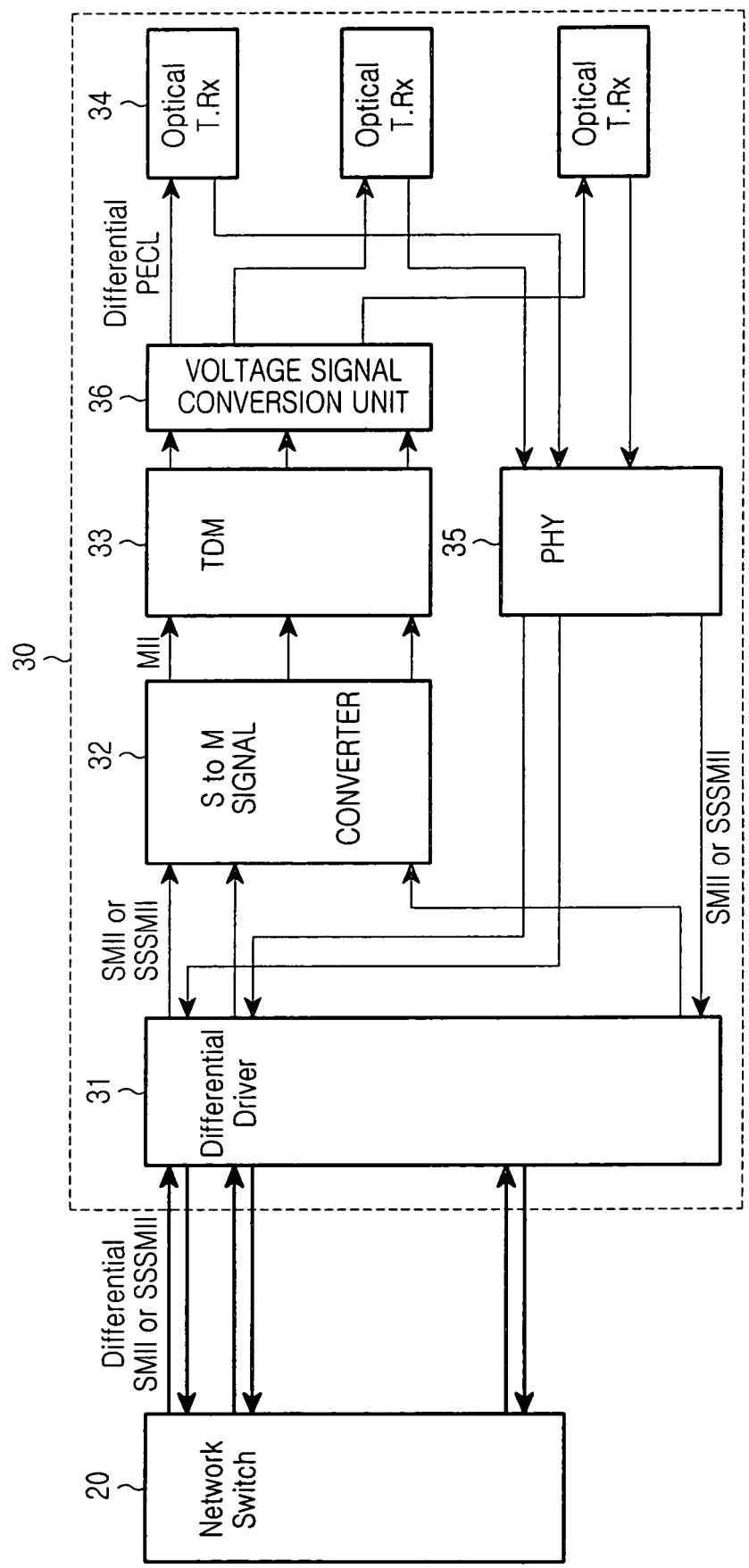
FIG. 5 is a block diagram of each of the SLUs in FIG. 4.

FIG. 5 is a block diagram of each of the SLUs shown in FIG. 4. As shown in FIG. 5, each of the SLUs 30 includes a differential driver 31, a signal converter 32, a time division multiplexor (hereinafter, referred to as a TDM) 33, a voltage signal conversion unit 36, a plurality of optical transceiving modules 34, and a PHY 35. The differential driver 31 is connected to the network switch 20 through a connector. The signal converter 32 is connected to one side of the differential driver 31. The TDM 33 is connected to an output side of the signal converter 32. The voltage signal conversion unit 36 is connected to an output side of the TDM 33. The plurality of optical transceiving modules 34 are connected to an output side of the voltage signal conversion unit 36. The PHY 35 is provided between the differential driver 31 and the optical transceiving modules 34 and converts optical signals output from the optical transceiving modules 34 into SMII signals.

The differential driver 31 converts differential SMII signals or SSSMII signals provided from the network switch 20 into SMII signals and then provides the SMII signals to the signal converter 32. The signal converter 32 converts the SMII signals into MII signals and then provides the MII signals to the TDM 33. The TDM 33 multiplexes Ethernet signals having a MII type and broadcasting signals and then provides the multiplexed signal to the voltage signal conversion unit 36. The voltage signal conversion unit 36 converts the multiplexed signal into a differential positive emitter coupled logic (hereinafter, referred to as a PECL) signal and then provides the differential PECL signal to the optical transceiving modules 34. The optical transceiving modules 34 generate optical signals according to the differential PECL signal and then transmit the optical signals to the subscriber set-top boxes (not shown).

Further, the optical transceiving modules 34 convert optical signals transmitted from the subscriber set-top boxes into differential PECL signals and then outputs the differential PECL signals to the PHY 35. The PHY 35 converts the received differential PECL signals into SMII signals and then outputs the SMII signals to the differential driver 31. The differential driver 31 subsequently converts the SMII signals into differential SMII signals and then provides the differential SMII signals to the network switch 20.

According to the present invention, each of the SLUs 30 receives the differential SMII signals, which are outputted from the network switch 20, through the differential driver 31 and the signal converter 32. Further, each of the SLUs 30 multiplexes the MII signals outputted from the signal converter 32 by the TDM 33, converts the multiplexed signal into a voltage signal by the PHY 35, converts the voltage signal into an optical signal by each of the optical transceiving modules 34, and then outputs the optical signal.

As described above, the network switch has a differential driver employing a connector as an interface, and the SLUs connected to the network switch are constructed to process the signals of the differential driver, so that the network switch can be connected to the SLUs by the connectors. Therefore, the data can be transmitted through the connectors between the SLUs and the network switch differently from the commercial L2 switch, which requires UTP cables for connection with the SLUs. That is, the switch chipset 21 of the network switch can be directly connected to the SLUs 30 connected to the network switch. As a result, the network switch and the SLUs 30 can be mounted in the same backplane board, and 10/100 M Ethernet data having a SMII type of the network switch can be transmitted to the SLUs 30 through the connectors instead of UTP cables.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A subscriber distribution network apparatus having a backplane board which includes a network switch and a plurality of subscriber line units (SLUs), the network switch switching both Ethernet data and broadcasting data, and the plurality of subscriber line units being provided between the network switch and subscriber set-tops so as to provide data from the network switch to a corresponding subscriber set-top, and to provide data transmitted from the subscriber set-tops back to the network switch, wherein the network switch comprises a switch chipset and a first differential driver which converts serial signals of Ethernet data and broadcasting data outputted from the switch chipset into differential signals, and wherein each SLU includes a second differential driver, a signal converter, a time division multiplexing processing unit, and an optical transceiving module, the second differential driver being connected to the first differential driver through a connector and restoring the differential signals into serial signals, the signal converter converting the serial signals outputted from the second differential driver into parallel signals, the time division multiplexing processing unit multiplexing Ethernet signal and broadcasting signal outputted in parallel to each other from the signal converter and converting the multiplexed signal into a voltage signal having a predetermined level, the optical transceiving module converting the voltage signal into an optical signal, outputting the optical signal to the subscriber set-tops, and providing the second differential driver with signals transmitted from the subscriber set-tops.

2. The subscriber distribution network apparatus as claimed in claim 1, wherein the network switch connects with the SLUs without any outside media attachment units (MAUs) having unshielded twisted pair (UTP) cables and media converters (M/C).

3. The subscriber distribution network apparatus as claimed in claim 2, wherein the network switch and the plurality of SLUs are arranged on said backplane board.

4. The subscriber distribution network apparatus as claimed in claim 1, wherein the network switch and the plurality of SLUs are adapted for arrangement on said backplane board.

5. The subscriber distribution network apparatus as claimed in claim 1, wherein each of the subscriber line units further comprises a PHY for converting voltage signals transmitted from the subscriber set-tops through the optical transceiving module into SMII serial signals and providing the SMII serial signals to the second differential driver.

6. The subscriber distribution network apparatus as claimed in claim 1, wherein the first differential driver converts SMII signals into differential SMII signals, and the second differential driver converts differential SMII signals into SMII signals.

7. The subscriber distribution network apparatus as claimed in claim 1, wherein the signal converter converts the SMII serial signals into MII parallel signals.

8. The subscriber distribution network apparatus as claimed in claim 1, wherein the time division multiplexing processing unit includes a TDM and a positive emitter control logic (PECL).

9. A subscriber line unit provided in a subscriber distribution network apparatus and connected to a network switch which converts serial signals of Ethernet data and broadcasting data into differential signals and outputs the differential signals, the subscriber line unit communicating with a plurality of subscriber set-tops, the subscriber line unit comprising:

a differential driver connected to the network switch through a connector to restore the differential signals outputted from the network switch into serial signals;

a signal converter for converting the serial signals outputted from the differential driver into parallel signals;

a time division multiplexing processing unit for multiplexing Ethernet signal and broadcasting signal outputted in parallel to each other from the signal convener and converting the multiplexed signal into a voltage signal having a predetermined level; and an optical transceiving module converting the voltage signal into an optical signal and outputting the optical signal and providing the differential driver with signals transmitted from the subscriber set-tops.

10. The subscriber distribution network apparatus as claimed in claim 9, further comprising a PHY for converting voltage signals transmitted from the subscriber set-tops through the optical transceiving module into SMII serial signals and providing the SMII serial signals to the differential driver.

11. The subscriber distribution network apparatus as claimed in claim 9, wherein the time division multiplexing processing unit includes a TDM and a positive emitter control logic (PECL).

12. A backplane board of a subscriber distribution network apparatus, the backplane board comprising a network switch and a plurality of subscriber line units, the network switch switching Ethernet data and broadcasting data, the plurality of subscriber line units being provided between the network switch and subscriber set-tops, providing data from the network switch to a corresponding subscriber set-top, and providing data transmitted from the subscriber set-tops to the network switch, wherein the network switch includes a switch chipset and a first differential driver which converts serial signals of Ethernet data and broadcasting data outputted from the switch chipset into differential signals, and wherein each of the subscriber line units includes a second differential driver, a signal converter, a time division multiplexing processing unit, and an optical transceiving module, the second differential driver being connected to the first differential driver through a connector and restoring the differential signals into serial signals, the signal converter converting the serial signals outputted from the second differential driver into parallel signals, the time division multiplexing processing unit multiplexing Ethernet signal and broadcasting signal outputted in parallel to each other from the signal converter and converting the multiplexed signal into a voltage signal having a predetermined level, the optical transceiving module converting the voltage signal into an optical signal, outputting the optical signal to the subscriber set-tops, and providing the second differential driver with signals transmitted from the subscriber set-tops.

13. A method for converting serial signals of Ethernet data and broadcasting data into differential signals of a subscriber line unit (SLU) and outputting the differential signals by the subscriber line unit provided in a subscriber distribution network apparatus and connected to a network switch, said method comprising the steps of:

(a) connecting a differential driver of the SLU to the network switch through a connector without using outside media attachment units (MAUs) having unshielded twisted pair (UTP) cables and media converters (M/C), to restore the differential signals output from the network switch into serial signals;

(b) converting the serial signals output from the differential driver into parallel signals;

(c) multiplexing both an Ethernet signal and a broadcasting signal output in parallel to each other from the signal converter by a time division multiplexing processing unit, and converting the multiplexed signal into a voltage signal having a predetermined level; and (d) converting the voltage signal into an optical signal and outputting the optical signal and providing the differential driver with signals transmitted from the subscriber set-tops.

14. The method recited in claim 13, further comprising:
converting voltage signals transmitted from the subscriber set-tops through the optical transceiving module by a PHY chip into SMII serial signals and providing the SMII serial signals to the differential driver.

15. The method according to claim 13, wherein the time division multiplexing processing unit includes a (time division multiplexor) TDM and a positive emitter control logic (PECL).

* * * * *